(No Model.)
B. E. VON POSSANNER-EHRNTHALL.
SEAL.
No. 470,257. Patented Mar. 8, 1892.
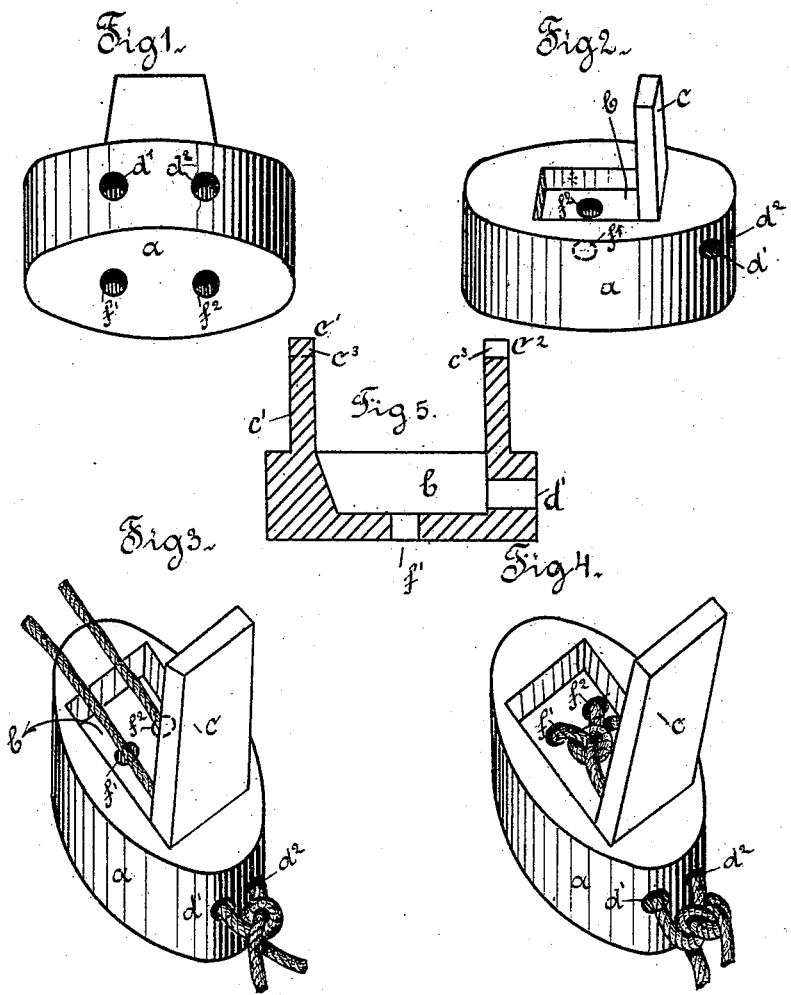

UNITED STATES PATENT OFFICE.

BENNO EDL. VON POSSANNER-EHRNTHALL, OF VIENNA, AUSTRIA-HUNGARY.

SEAL.

SPECIFICATION forming part of Letters Patent No. 470,257, dated March 8, 1892.

Application filed February 12, 1890. Serial No. 340,097. (No model.)

*To all whom it may concern:*

Be it known that I, BENNO EDLER VON POSSANNER-EHRNTHALL, a subject of the Emperor of Austria-Hungary, residing at Vienna, in the Empire of Austria-Hungary, have invented certain new and useful Improvements in Seals; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved seal; and its object is to provide means for rendering it absolutely impossible to tamper with the seal without defacing the coinage thereupon. In carrying it into effect I provide a block of a suitable size and material (preferably of lead) having a cavity formed therein. A pair of perforations leads from the circumference of the block into the cavity and another pair from the cavity to the flat surface or bottom of the block. Besides, I provide a cover or several covers for the cavity, which cover or covers are integral with the body or block and may have smooth or toothed edges.

In the annexed drawings, Figure 1 represents a perspective front view, and Fig. 2 a similar side view, of my improved seal. Fig. 3 shows the inserted cord. Fig. 4 represents the latter after the forming of the second knot, the ends of the cord being inserted into the two holes or perforations on the under side. Fig. 5 is a section of a modification.

The seal consists of the body or block $a$, the one flat surface of which is provided with a cavity $b$, into which can be pressed a cover $c$, (or two or several covers $c'$ $c^2$,) as will be explained hereinafter.

$d'$ $d^2$ are perforations which lead from the circumference of the block into the cavity $b$, and another pair $f'$ $f^2$ leads from the cavity to the outside or flat bottom of the block.

The two ends of the cord to be sealed are first tied and then passed through the perforations $d'$ $d^2$ into the cavity $b$, Fig. 3. The block is then pushed up to the last knot, and the cord ends are then united to a second knot, and the ends of the cord are next drawn tightly through the second pair of perforations $f'$ $f^2$, which causes the second knot to enter the cavity. The cover $c$ of the cavity is then bent down, so as to close it. The protruding ends of the cord (passing through the perforations $f'$ $f^2$) are cut off close to the block, and then the seal is pressed by any suitable seal-press. The top of the block now presents the appearance of a solid seal, while the opposite side only shows in cross-section the pieces of the cord, so that it is quite impossible to remove the cord without injuring the coinage.

I wish to have it expressly understood that the inserting of the cord ends through the perforations $f'$ $f^2$ is only necessary when the cord is so thin that the operation may be effected without any difficulty. In the other case it is sufficient to cut off the ends of the cord near the knot and to press the latter into the cavity. Both the spots of the cord are then to be seen just so distinctly as when the cord ends are put through the perforations.

Fig. 5 represents a modification of my seal. Here are provided two covers $c'$ $c^2$ instead of one; but it is obvious that also more than two covers may be used. The edges of the covers may be smooth or toothed, as indicated at $c^3$, Fig. 5. Instead of two openings $f'$ $f^2$ at the bottom, one may also use but one opening. Besides, the cover $c$ may be provided with openings.

Having fully described my invention, what I claim, and desire to secure by Letters Patent, is—

In a seal, the combination of the block having a cavity formed in its top and provided with an integral cover adapted to close said cavity when pressed down on its seat, said block being also provided with a pair of perforations through its side, adapted to admit the ends of the cord into the cavity, and a second pair of perforations to allow the ends of the cord to pass out of said cavity, especially as described, and for the purpose specified.

In testimony whereof I have signed this specification in the presence of two subscribing witnesses.

BENNO EDL. VON POSSANNER-EHRNTHALL.

Witnesses:
RUDOLF VON PLANK,
NETTIE S. HARRIS.